United States Patent [19]

Kanda

[11] Patent Number: 4,667,225
[45] Date of Patent: May 19, 1987

[54] NOISE REDUCTION CIRCUIT FOR COMPOSITE COLOR VIDEO SIGNALS

[75] Inventor: Masao Kanda, Tokorozawa, Japan

[73] Assignee: Pioneer Electronic Corporation, Tokyo, Japan

[21] Appl. No.: 713,843

[22] Filed: Mar. 20, 1985

[30] Foreign Application Priority Data

Mar. 21, 1984 [JP] Japan .................. 59-040314[U]

[51] Int. Cl.$^4$ ............................................. H04N 9/64
[52] U.S. Cl. ..................................... 358/36; 358/167
[58] Field of Search ................... 358/36, 196, 167, 198

[56] References Cited

U.S. PATENT DOCUMENTS

| 4,263,619 | 4/1981 | Theriault | 358/196 |
|---|---|---|---|
| 4,291,330 | 9/1981 | Hirai | 358/36 |
| 4,302,768 | 11/1981 | Kamura | 358/36 |
| 4,376,953 | 3/1983 | Naimpally | 358/196 |

Primary Examiner—Michael A. Masinick
Attorney, Agent, or Firm—Fleit, Jacobson, Cohen & Price

[57] ABSTRACT

A noise reduction circuit for eliminating the noises contained in a composite color video signal, including a high-pass filter for extracting high-frequency components from composite color video signal, an amplitude limiter responsive to the high-frequency components to limit the amplitudes of these components, a phase inverter for inverting the phase of the output from the amplitude-limiter, a mixing network receiving both of the composite color video signal and the output from the phase inverter so that the noises contained in the former are substantially cancelled by the latter, wherein a notch filter is provided to attenuate signal components of a predetermined frequency contained in the input signal to the amplitude limiter to remove the chrominance component from the signal to be supplied to the amplitude limiter. The noise reduction circuit is useful especially in a composite color video reproduction system of a constant-line-velocity video disc player having special reproduction modes such as the still-motion, fast-feed and slow-motion modes.

4 Claims, 10 Drawing Figures

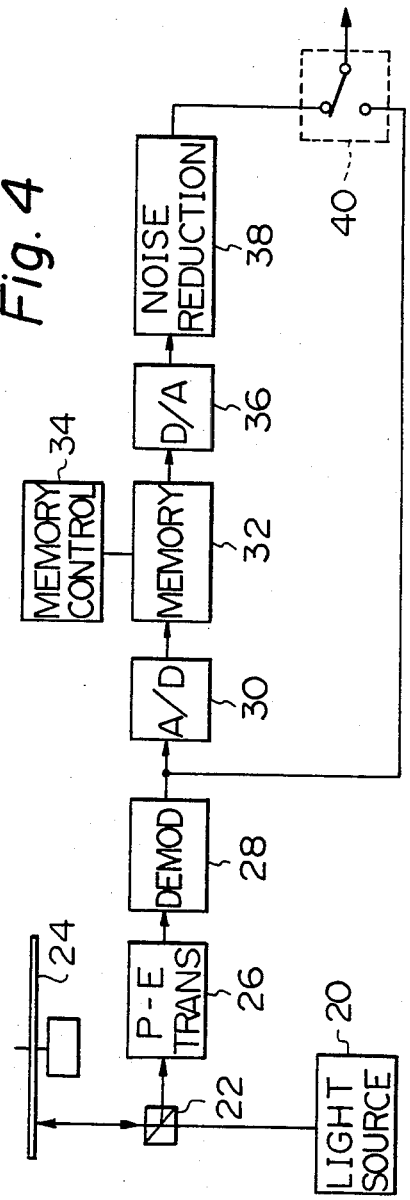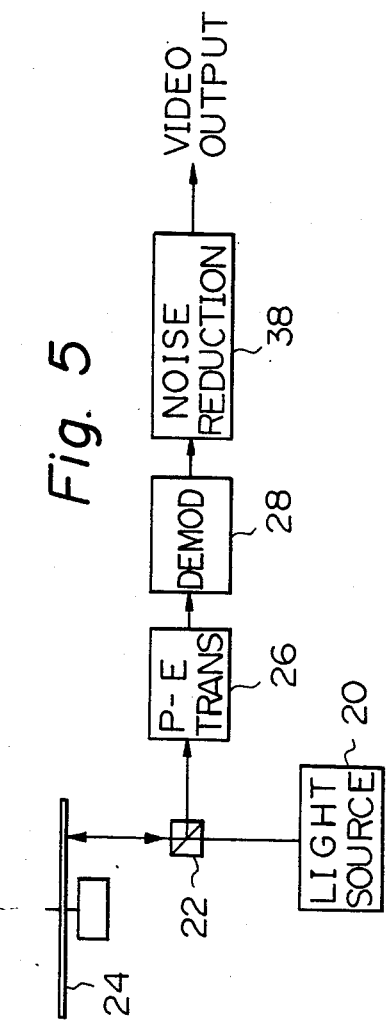

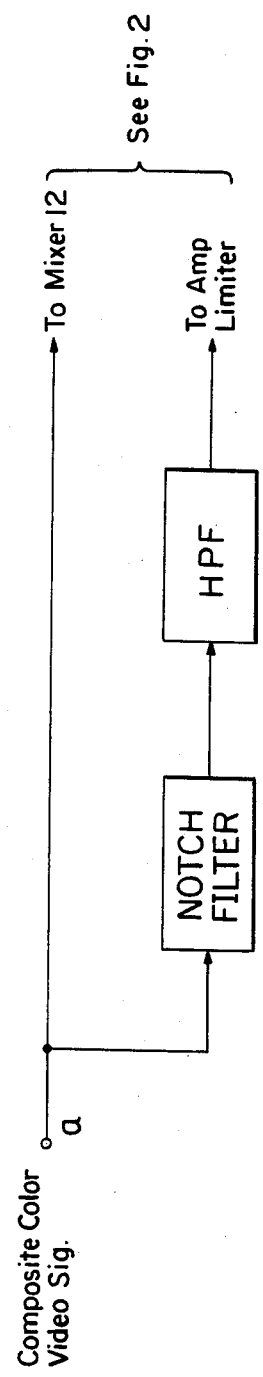

NOISE REDUCTION CIRCUIT FOR COMPOSITE COLOR VIDEO SIGNALS

FIELD OF THE INVENTION

The present invention relates to a noise reduction circuit and, more particularly, to a noise reduction circuit which is advantageous for the elimination of noises in composite color video signals.

BACKGROUND OF THE INVENTION

In a color video display system such as a video tape recorder in which low-frequency converted color signals are recorded, a composite color video signal is separated into luminance and chrominance components before the signal is to be processed. In a noise reduction circuit used in such a system, a luminance signal containing noises is fed to a high-pass filter to extract therefrom high-frequency components containing the noises. Noise components of limited amplitudes are derived from the the resultant output signal from the high-pass filter. The noise components are, upon phase inversion, added to the original luminance signal. The noises in the two signals are thus cancelled by each other so that a noise-free luminance signal is obtained.

When a composite color video signal is used as an input signal for such a noise reduction circuit, the high frequency components extracted from the signal supplied to the high-pass filter contain not only the noise components but the chrominance signals of the frequency which falls within the frequency band of the noise components. If the chrominance signal has an amplitude larger than the threshold value of the amplitude limiter used, then the amplitude limiter would be saturated with such chrominance signals and would be disabled from passing the noise components therethrough.

A video disc player (VDP) uses composite color video signals which are recorded on a record medium not in forms separated into luminance and chrominance components. If a noise reduction circuit of the described nature is to be used in such a system, it is thus necessary to add to the noise reduction circuit a network to separate the information read from the record medium into luminance and chrominance signal components. A known form of luminance-chrominance separation network used for this purpose is a comb filter which uses a charge-coupled device providing a time delay lasting for one scanning period. The provision of such a network however causes deterioration of the signals used and results in, for example, deformation of the signal waveforms, degradation of the signal-to-noise ratio as invited by the CCD device per se or by the leaks of clock pulses applied to the CCD device, an increase in the production cost, and so on. A goal of the present invention is to make it possible to remove noises directly from raw composite color video signals without separating the composite video signals into luminance and chrominance components.

OBJECTS OF THE INVENTION

It is, accordingly, an important object of the present invention to provide an improved noise reduction circuit which can remove noises from composite color video signals without having recourse to the separation of the composite video signals into luminance and chrominance components.

It is another important object of the present invention to provide a composite color video reproduction system incorporating such an improved noise reduction circuit. Such a video reproduction system is useful particularly in a video disc player of, typically, the constant-line-velocity type having special reproduction modes such as the still-motion, fast-feed and slow-motion modes in addition to an ordinary reproduction mode.

SUMMARY OF THE INVENTION

In accordance with the present invention, there is provided a noise reduction circuit for eliminating the noises contained in a composite color video signal, comprising high-frequency extracting means for receiving the composite color video signal and extracting high-frequency components from the composite color video signal received, amplitude limiting means responsive to the high-frequency components and operative to limit the amplitudes of these components, phase inverting means for inverting the phase of the amplitude-limited high-frequency components, mixing means for receiving both of the composite color video signal and the phase-inverted, amplitude-limited high-frequency components so that the noises contained in the former are substantially cancelled by the latter, and attenuating means operative to attenuate signal components of a predetermined frequency contained in the input signal to the amplitude limiting means.

The amplitude limiting means is preferably operative to limit the amplitudes of these components within a predetermined range within which the amplitudes of the noise components of the composite color video signal fall. The aforesaid predetermined frequency is, typically, the color subcarrier frequency of the composite color video signal and is 3.58 megahertz for NTSC composite color video signal.

BRIEF DESCRIPTION OF THE DRAWINGS

The drawbacks of a prior-art noise reduction circuit and the features and advantages of a noise reduction circuit according to the present invention will be more clearly understood from the following description taken in conjunction with the accompanying drawings in which like reference numerals designate similar or corresponding units and in which:

FIG. 4 is a block diagram showing an example of a composite color video reproduction system incorporating a noise reduction circuit according to the present invention;

FIG. 5 is a block diagram showing another example of a composite color video reproduction system incorporating a noise reduction circuit according to the present invention; and FIG. 6 illustrates a partial block diagram showing the notch filter in an anterior position with respect to the high pass filter.

DESCRIPTION OF THE PRIOR ART

Figure 1:
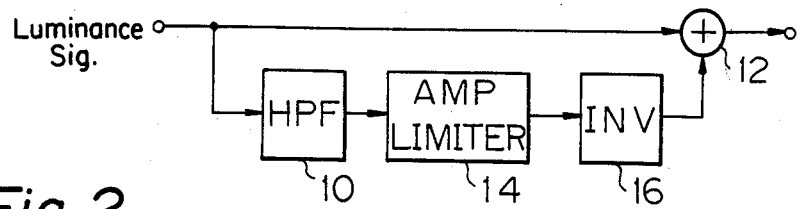
FIG. 1 is a block diagram showing an example of a known noise reduction circuit.

As noted at the outset of the description, a composite color video signal to be processed in a color video display system in which color signals are to be recorded upon low-frequency conversion is separated into brightness and chrominance components before the signals are processed to produce a picture to be displayed. A known example of a noise reduction circuit used in such a system is shown in FIG. 1 of the drawings. In the noise reduction circuit herein shown, a luminance signal containing noises is fed on on e hand to a highpass filter 10 (HPF) and on the other hand to a mixing network 12 which is constructed typically in the form of, for example, a summing circuit. High-frequency components containing the noises are extracted from the signal supplied to the high-pass filter 10 and the resultant output signal is transferred to an amplitude limiter 14. The amplitude limiter 14 derives the noise components of small amplitudes from the input signal and supplies the noise components to a phase inverting amplifier 16 for phase inversion. The phase inverted noise components thus produced by the phase inverting amplifier 16 are fed to the mixing network 12 and are added to the original luminance signal also supplied to the mixing network 12. The noises in the two signals put into the mixing network 12 are thus cancelled by each other in the mixing network 12, which therefore produces a noise-free luminance signal at its output terminal.

When a composite video signal such as a standard NTSC color video signal is used as an input signal for the noise reduction circuit of the above described nature, the high frequency components extracted from the video signal by the high-pass filter 10 contain not only the noise components but the chrominance signal having the subcarrier frequency of, for example, 3.58 megahertz for the NTSC video format signals. Thus, the chrominance signal of the frequency which falls within the frequency band of the noise components is removed along with the noise signals from the supplied composite video signal. If, furthermore, the chrominance signal has an amplitude larger than the threshold value of the amplitude limiter 14, the amplitude limiter 14 would be saturated with such chrominance signals and would accordingly be disabled from passing the noises components therethrough.

A video disc player uses composite color video signals which are recorded on a record medium not in forms separated into luminance and chrominance components and are read out in raw states from the record medium. If a noise reduction circuit of the described nature is to be used in such a video display system to remove noises from the luminance component of the color video signal, it is thus necessary to add to the noise reduction circuit a luminance-chrominance separation network to separate the information read from the record medium into luminance and chrominance signal components. A known form of luminance-chrominance separation network used for this purpose is a comb filter which uses a charge-coupled device (CCD) as a time delay element providing a time delay lasting for exactly one horizontal scanning line (1H).

As is well known in the art, however, a luminance-chrominance separation network of the type using a comb filter is not capable of perfectly separating a composite color video signal into luminance and chrominance components, as in the case of any other types of luminance-chrominance separation circuits. As a matter of fact, the chrominance component extracted from the color video signal by the use of a comb filter contains a portion of the luminance component and accordingly the noises intrinsic in the luminance component.

One of the factors which is respansible for the deterioration of the signal-to-noise ratio of a picture reproduced in, for example, a laser disc player is the audio beats, which are contained to approximately equal degrees in both of the luminance and chrominance components separated from a composite color video signal. To remove noises only from the luminance conponent is, for this reason, a mere one-sided expedient and thus appreciable improvement could not be achieved in the signal-to-noise ratio of the reproduced picture unless noises are removed from both of the luminance and chrominance components separated from the color video signal. This means that it would be reasonable and beneficial to economically remove noises directly from a composite color video signal rather than to remove noises from the luminance and chrominance components separated from the color video signal. A circuitry to remove noises directly from a composite color video signal can dispense with a comb filter or any other form of luminance-chrominance separation network. Furthermore, only one such noise reduction circuitry will suffice in the system to process a composite color video signal. Difficulties have however been encountered in implementing a noise reduction circuitry capable of removing noises from raw composite color video signals used in video disc players.

DESCRIPTION OF THE PREFERRED EMBODIMENTS

Figure 2:
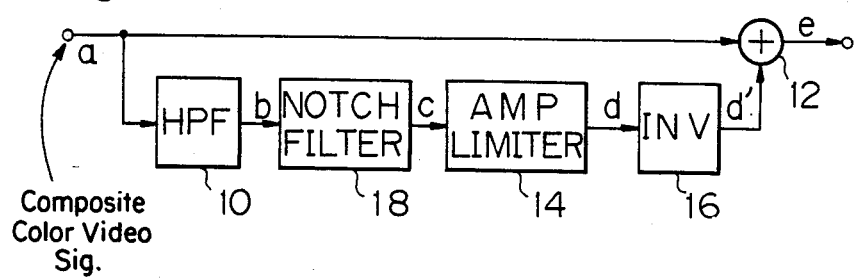
FIG. 2 is a block diagram showing a preferred embodiment of a noise reduction circuit according to the present invention.

Referring to FIG. 2 of the drawings, a preferred embodiment of the present invention is basically similar to the prior-art noise reduction circuit of FIG. 1 in that it includes a high-pass filter 10, a mixing network 12, an amplitude limiter 14 and a phase inverting amplifier 16. The mixing network 12 is constructed typically in the form of a summing circuit as previously noted. In the embodiment of the present invention, there is further provided a notch filter 18 which is shown connected between the high-pass filter 10 and the amplitude limiter 14. The notch filter 18 provides attenuating means to remove or attenuate signal components of a predetermined "null" frequency which is herein assumed to be 3.58 megahertz which corresponds to the color subcarrier frequency of standard NTSC composite color video signals.

Figure 3A:
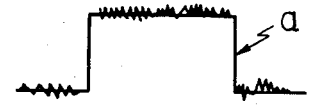
FIGS. 3A, 3B, 3C, 3D and 3E show waveforms of signals to be processed in the noise reduction circuit shown in FIG. 2.
Figure 3B:
Figure 3C:
Figure 3D:
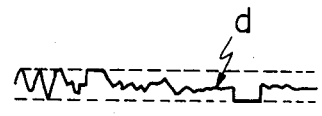
Figure 3E:
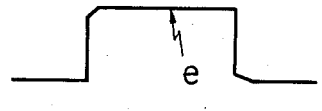

In the noise reduction circuit thus constructed, an NTSC composite color video signal a containing noises as indicated in FIG. 3A is fed on one hand to the high-pass filter 10 and on the other hand to the mixing network 12. High-frequency components, containing the noises and a chrominance signal, are extracted from the signal a by the high-pass filter 10 and the resultant output signal b having a waveform as shown in FIG. 3B is transferred to the notch filter 18. The signal b produced by the high-pass filter 10 consists of the high-frequency luminance components and the chrominance and noise components of the original composite video signal. Out of these signal components supplied to the notch filter 18, the chrominance signal with the subcarrier frequency of 3.58 megahertz is selectively removed by the notch filter 18, which therefore produces an output signal c (FIG. 3C) consisting of the high-frequency luminance components and the noise components of the original composite video signal. The amplitude limiter 14 clips high-level and low-level portions of the high-frequency components of the luminance signal and thus limits the amplitudes of these signal components within a predetermined range within which the amplitudes of the noise components fall. A noise component waveform d which is substantially free from the high-frequency components of the luminance signal as shown in FIG. 3D is thus obtained from the amplitude limiter 14 and supplied to the phase inverting amplifier 16 and the signal is then inverted in phase in the phase inverting amplifier 16. The phase inverted noise component waveform, indicated at d' in FIG. 2, is fed to the mixing network 12 and is added to the original composite color video signal also supplied to the mixing network 12. The noises in the two signals a and d' put into the mixing network 12 are thus cancelled by each other in the mixing network 12, which therefore produces at its output terminal a noise-free composite color video signal e which consists of the luminance signal and the chrominance signal with the subcarrier frequency of 3.58 megahertz.

FIG. 4 of the drawings shows an example of a composite video reproduction system using a noise reduction circuit according to the present invention in a constant-line-velocity disc player of the optical scanning type.

A constant-line-velocity video disc player having special reproduction modes such as the still-motion, fast-feed and slow-motion modes indispensably uses a memory in the reproduction system thereof. In the reproduction system shown in FIG. 4, a laser beam emanating from a light source 20 is directed through optics shown represented by a beam splitter 22 and impinges upon a rotating optical video disc 24. The beam reflected from the disc 24 is redirected through the beam splitter 22 to a photoelectric transducer 26 which produces an electric composite color video signal from the optical information read from the video disc 24 and contained in the reflected beam put into the transducer 26. The electric composite color video signal is demodulated by a demodulator 28 and is digitized by an analog-to-digital converter 30. The digitized color video signal is once loaded into a memory unit 32 which is operative to memorize digital color video signals of each frame or field and to output pulses for selected frames or fields at timings controlled by a memory control 34, providing the reproduction mode specified by the memory control 34. These pulses are converted into an analog signal by means of a digital-to-analog converter 36 subsequent to the memory unit 32. A noise reduction circuit 38 is connected to the output terminal of this digital-to-analog converter 36 and removes noises from the analog composite color video signal adapted to produce pictures in the selected special mode. The noise reduction circuit 38 is assumed, by way of example, to be constructed and arranged similarly to the circuit described with reference to FIG. 2 and is thus characterized by the provision of the notch filter 18 between the high-pass filter 10 and the amplitude limiter 14 (FIG. 2). In the arrangement shown in FIG. 4, there is further provided a switch 40 to allow selection between an ordinary reproduction mode directly from the composite color video signal supplied from the demodulator 28 and a special reproduction mode through the memory unit 32.

In order to obtain a better reproduction accuracy with respect to the original video signal (which in this instance is the output from the demodulator 28), it is necessary to quantitize the input signal with the larger number of bits per unit time as in the analog-to-digital converter 30. The use of a larger number of bits in quantization however results in an increase in the storage capacity of the memory unit 32 and requires the use of more expensive analog-to-digital and digital-to-analog converters as compared with the converters 30 and 36 in a video reproduction system of the above described nature. When a continuously varying analog amplitude is quantitized into discrete amplitudes represented by a finite number of binary signals uniquely assigned to the various amplitudes, the process of quantization introduces inherent distortion due to the errors stemming from the original video signal. Thus, the analog signal produced by the digital-to-analog converter 36 inevitably contains quantitization noises, the magnitude of which increases as the number of the bits used in the quantitization process decreases. Where the quantitization process is carried out with use of, for example, 6 bits from an economical point of view, the resultant quantitization noises are of such a level that they are readily discernible on the pictures displayed and are thus responsible for the deterioration of the signal-to-noise characteristics of the system. This is the major reason for which addition of the noise reduction circuit 38 according to the present invention wherein it is desirable to use the composite video reproduction system of a video disc player of the constant-line-velocity type having special reproduction modes. Where, on the other hand, a composite video signal is separated into luminance and chrominance components by the use of a comb filter as previously discussed, quantitization noises are introduced into both of the luminance and chrominance components during the process of quantitizing these components. Another reason for preferably using the noise reduction circuit 38 according to the present invention is that in the reproduction system of a video disc player of the constant-line-velocity type, noises, including the quantitization noises, can be removed from the composite video signal to be output from the reproduction system. It may however be noted that a noise reduction circuit according to the present invention as incorporated into such a reproduction system is useful not only for the removal of the quantitization noises but also for the elimination of other video noises such as audio beats. For this reason, a noise reduction circuit according to the present invention may be provided also directly between the demodulator 28 and the switch 40 to bypass the memory unit 32 in the arrangement of FIG. 4 though not shown, or may be provided in a composite color video reproduction system which dispenses with a memory as illustrated in FIG. 5. In FIG. 5, the noise reduction circuit 38 is shown connected to the output terminal of the demodulator 28 to remove noises, including audio beats, from the analog composite color video signal to be output from the system.

It will be understood that while the notch filter 18 forming part of the embodiment shown in FIG. 2 is provided between the high-pass filter 10 and the amplitude limiter 14, the notch filter 18 may be provided anterior to the high-pass filter 10 if desired. See FIG. 6 showing a partial block diagram of this embodiment. In this instance, the chrominance signal with the subcarrier frequency of 3.58 megahertz is selectively removed directly from the supplied composite video signal a before the low-frequency luminance components are removed from the composite video signal by means of the high-pass filter 10. The highpass filter 10 thus receives an input signal which consists of the low-frequency and high-frequency luminance components and the noise components of the original composite video signal a.

It will also be apparent that although the null frequency of the notch filter 18 in the embodiment described has been assumed to be the subcarrier frequency of standard NTSC color signals, the color signal subcarrier frequency of any other television signals such as the standard PAL or SECAM composite color video signals may be used as the null frequency of the notch filter 18.

What is claimed is:

1. A noise reduction circuit for eliminating the noises contained in a composite color video signal demodulated from an information signal read from an information recording disc, comprising:
   high-frequency extracting means for receiving the composite color video signal and extracting high-frequency components from the composite color video signal received,
   amplitude limiting means responsive to said high-frequency components and operative to limit the amplitudes of these components with a predetermined range within which the amplitues of the noise components of said composite color video signal fall,
   phase inverting means for inverting the phase of the amplitude-limited high-frequency components,
   mixing means for receiving both of said composite color video signal and the phase-inverted, amplitude-limited high-frequency components so that the noises contained in the former are substantially cancelled by the latter, and
   attenuating means operative to attenuate signal components of a color subcarrier frequency contained in the composite color video signal before limiting the amplitudes of the high-frequency components in said amplitude limiting means.

2. A noise reduction circuit as set forth in claim 1, in which said attenuating means is provided between said high-frequency extracting means and said amplitude limiting means so that the high-frequency extracting means produces and the amplitude limiting means receives a signal consisting of the high-frequency luminance components and the chrominance and noise components of the original composite color video signal and the amplitude limiting means produces an output signal consisting of the high-frequency luminance components and the noise components of the original composite color video signal.

3. A noise reduction circuit as set forth in claim 1, in which said attenuating means is provided anterior to said high-frequency extracting means and is operative to attenuate signal components of the color subcarrier frequency contained in the original composite color video signal so that the high-frequency extracting means is supplied with an attenuated signal which consists of the low-frequency and high-frequency luminance components and the noise components of the original composite color video signal.

4. A noise reduction circuit for eliminating the noises contained in a composite color video signal converted from a digitalized composite color video signal which is stored in a video signal memory, comprising:
   high-frequency extracting means for receiving the composite color video signal and extracting high-frequency components from the composite color video signal received,
   amplitude limiting means responsive to said high-frequency components and operative to limit the amplitudes of these components within a predetermined range within which the amplitudes of the noise components of said composite color video signal fall,
   phase inverting means for inverting the phase of the amplitude-limited high-frequency components,
   mixing means for receiving both of said composite color video signal and the phase-inverted, amplitude-limited high-frequency components so that the noises contained in the former are substantially cancelled by the latter, and
   attenuating means operative to attenuate signal components of frequency contained in the composite color video signal before limiting the amplitudes of the high-frequency components in said amplitude limiting means.

* * * * *